Jan. 19, 1932.   G. A. LEYNER   1,841,612
CLUTCH QUIETING MEANS
Filed March 13, 1931
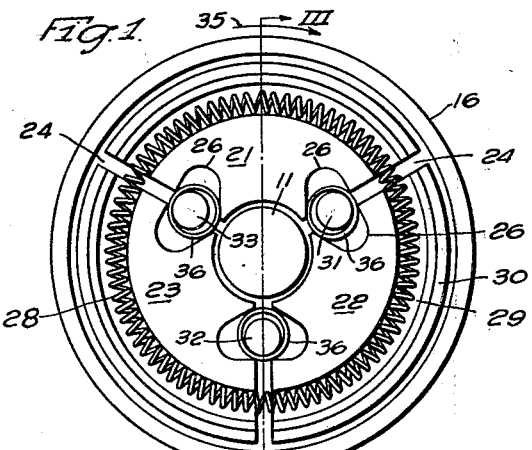
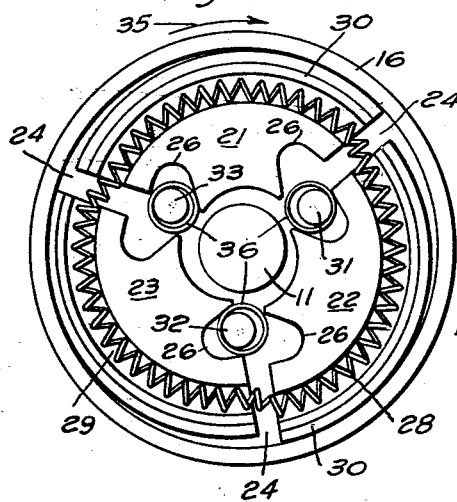
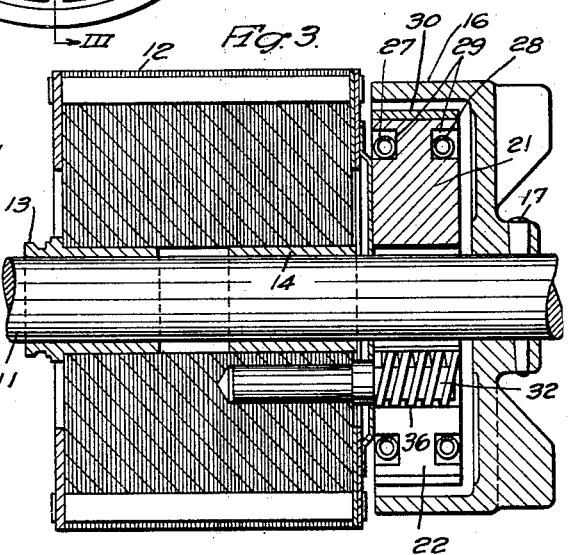
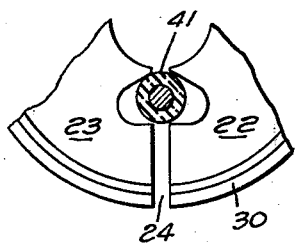
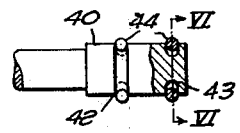
WITNESSES.
INVENTOR
George A. Leyner.
BY
ATTORNEY Patented Jan. 19, 1932

1,841,612

UNITED STATES PATENT OFFICE

GEORGE A. LEYNER, OF EAST SPRINGFIELD, MASSACHUSETTS, ASSIGNOR TO WESTINGHOUSE ELECTRIC & MANUFACTURING COMPANY, A CORPORATION OF PENNSYLVANIA

CLUTCH QUIETING MEANS

Application filed March 13, 1931. Serial No. 522,291.

My invention relates to clutches and particularly to centrifugally-actuable clutches.

An object of my invention is to provide a relatively simple and highly efficient noise-reducing means in a centrifugal clutch.

My invention is particularly adapted to be used on a clutch of the type disclosed and claimed in the application, Serial No. 433,930, filed by H. D. Else on March 7, 1930, and assigned to the Westinghouse Electric & Manufacturing Company. In this clutch, is provided a driven shell, a plurality of similar centrifugally-actuable weights located within the shell, each weight being provided with a recess in each radial edge, in which is located a driving pin. A resilient member, engaging all of the weights, prevents engagement between the weights and the shell until a predetermined speed of rotation is reached.

It has been found that there is a tendency for the clutch to rattle, that is, the driven weights may rattle on the driving pins respectively engaging therewith, particularly under pulsating-torque conditions of the driving pins. It is an object of my invention to provide means for either preventing the rattle of the weights on the driving pins or for materially reducing the noise of such rattle.

In practicing my invention, I provide resilient means surrounding each driving pin and located between the pin and the weights for either materially reducing the rattle or for deadening the noise thereof.

In the single sheet of drawings,

Figure 1 is a view, in end elevation, of a clutch with which is associated the construction embodying my invention, the parts being shown in the positions occupied at zero speed.

Fig. 2 is a view similar to Fig. 1, illustrating the parts in the positions occupied by them at normal operating speed.

Fig. 3 is a view, in axial section, through a rotor and a clutch associated therewith, the section being shown on the line III—III of Fig. 1.

Fig. 4 is a detail view showing a modified form of the invention, and

Figs. 5 and 6 are views in side elevation and in section, respectively, of a still further modification embodying my invention, Fig. 6 being a section on the line VI—VI of Fig. 5.

A motor shaft 11 has a rotor 12 loosely mounted thereon which, as shown in the present instance, may be of the squirrel-cage type, the rotor being mounted on two spaced bushings 13 and 14 which, in turn, are loosely mounted on the shaft 11, suitable means, not shown, being provided to hold the rotor in a predetermined axial position on the shaft.

A driven shell 16 is rigidly keyed on the shaft 11 by a through tapering pin 17. While I have shown a through tapering pin, it is obvious that any other securing device, effective for the same purpose, may be utilized.

Within the driven shell 16 are located three similar weights 21, 22 and 23, each of generally segmental shape, the peripheral extent of each weight being such as to provide a small space 24 between the adjacent radial edges of adjacent weights. Each weight is provided with a recess 26, of substantially V-shape, at its inner corner and particularly at its radial edge. The weights 21, 22 and 23 are yieldingly held in their normal inactive positions, as shown in Fig. 1 of the drawings, by a pair of garter springs 27 and 28 which are located in arcuate grooves 29 in the end faces of the respective weights. A wear-resisting facing 30 is secured to the outer peripheral surface of each weight.

Corresponding driving pins 31, 32 and 33 extend into the respective pairs of adjacent recesses 26 and have portions fitting tightly into the rotor structure 12, as is shown in Fig. 3 of the drawings.

The shape dimensions and location of the respective recesses 26 is such that the individual weights will be driven by a driving pin trailing the weight, so that only the leading outer peripheral portion of each weight will engage the inner surface of the shell, as is shown more particularly in Fig. 2 of the drawings, in which an arrow 35 indicates the direction of rotation of the clutch structure.

If a pin of a certain diameter is provided, it has been found that there is a tendency for the weight to rattle on its driving pin, particularly if the rotor 12 is energized by a single-phase stator, as is so common in fractional-horsepower motors.

I have found it possible to prevent this rattle by surrounding each pin by a yielding means, and Figs. 1, 2 and 3 show the use of a helical spring 36 loosely surrounding a pin. Reference to Fig. 1 of the drawings will show that, at zero speed and at all speeds up to a predetermined value, the weights will be yieldingly pulled in against the helical springs 36 to provide substantially direct engagement between the weight and the pin operatively engaged thereby. In other words, the clearance between a pin and the surrounding helical spring of slightly larger diameter will be adjacent to the radially inner surface of the pin.

However, when the clutch is operating at its normal speed and the weights have been moved so that the leading outer peripheral portion is in frictional engagement with the shell (as shown in Fig. 2), the respective springs 36 will have shifted their point of engagement on the individual pins surrounded thereby in the manner shown in Fig. 2 of the drawings. It will be noticed that springs 36 fit tightly in the trailing recesses 26, and that the respective pins 31, 32 and 33 fit resiliently in the respective springs 36, as shown in Fig. 2 of the drawings.

Referring to Fig. 4 of the drawings, I have there shown a modified form of a device embodying my invention, and including, more particularly, an annular member 41 which may be made of a resilient material, such as a phenolic condensation product including a fiber base, usually known as micarta.

Figs. 5 and 6 illustrate a still further modification of my noise-reducing means, in which a pin 40 has a pair of annular grooves 42 and 43 and spring rings 44 are located in the respective grooves. I have found that the action of the spring rings 44 is substantially the same as that of the helical spring 36 shown in Figs. 1 to 3, inclusive.

The device embodying my invention is particularly valuable in the case of a pulsating torque of the driving pins which, as has already been set forth, occurs in single-phase motors, and the use of the device embodying my invention has reduced the rattle of the weight on the pin to an almost negligible degree and has also deadened the sound of any rattle which may occur. This is because of the resilient means on the driving pins which maintains an elastic interfit of the pin and the weight under pulsating-torque conditions of operation.

Reference is here made to copending applications, Serial No. 527,190, by H. D. Else and C. R. Libby; Serial No. 527,191, by H. D. Else; and Serial No. 527,192, by C. R. Libby, all filed of even date herewith and all assigned to the Westinghouse Electric & Manufacturing Company.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A centrifugal clutch including a driven shell, a centrifugally-actuable weight in the shell, resilient means for preventing engagement of the weight and the shell below a predetermined speed and a driving means for the weight including a pin interfitting with the trailing end of the weight, a resilient means on the pin for maintaining an elastic interfit of the pin and weight under pulsating-torque conditions of the driving pin.

2. A centrifugal clutch including a driven shell, a centrifugally-actuable weight in the shell and resilient means for preventing engagement of the weight and the shell below a predetermined speed, and a driving pin located in a trailing position relative to the weight to drive the same, a resilient means surrounding the pin and providing a yielding contact between the pin and the weight under pulsating-torque conditions of the pin to prevent rattle of the weight on the pin under pulsating-torque conditions.

3. A centrifugal clutch including a driven shell, a centrifugally-actuable weight in the shell having a recess of substantially wedge-shape in a trailing edge, a resilient means operatively engaging the weight for preventing engagement thereof with the shell below a predetermined speed and a pin fitting in the recess for driving the weight, a resilient means surrounding the pin and providing a yielding engagement between the pin and the walls of the recess of wedge-shape in the weight to preclude rattle therebetween under pulsating-torque conditions of the driving pin.

4. centrifugal clutch including a driven shell, a plurality of centrifugally-actuable weights within the shell, each weight having a recess of substantially V-shape at each inner corner, a resilient means engaging the weights for preventing their engaging the shell at all speeds below a predetermined value, driving pins in each pair of recesses, each pin engaging and driving a leading weight at speeds above the predetermined value, resilient means on each pin for directly and tightly fitting into the recess of a leading weight to prevent rattle therebetween under pulsating-torque conditions of the driving pin.

5. A clutch including a driven shell, a centrifugally actuable weight in the shell having a recess of substantially V-shape in a trailing edge, a pin in the recess for driving the weight, and resilient means engaging the weight for preventing the outer surface thereof at the leading edge from frictionally engaging the shell at speeds below a predetermined value, resilient means on the pin providing a yielding engagement between the pin and the walls of the recess in the weight to preclude rattle therebetween under pulsating-torque conditions.

In testimony whereof, I have hereunto subscribed my name this 7th day of March 1931.

GEORGE A. LEYNER.